US008624984B2

(12) United States Patent
Azuma et al.

(10) Patent No.: US 8,624,984 B2
(45) Date of Patent: Jan. 7, 2014

(54) ELECTRONIC CAMERA

(75) Inventors: Seiichi Azuma, Wuxi (CN); Toshiyuki Nakamura, Tokyo (JP); Mio Nagisa, Tokyo (JP)

(73) Assignee: Nikon Corporation, Tokyo (JP)

( * ) Notice: Subject to any disclaimer, the term of this patent is extended or adjusted under 35 U.S.C. 154(b) by 652 days.

(21) Appl. No.: 12/448,371

(22) PCT Filed: Feb. 19, 2008

(86) PCT No.: PCT/JP2008/052752
§ 371 (c)(1),
(2), (4) Date: Jun. 18, 2009

(87) PCT Pub. No.: WO2008/102769
PCT Pub. Date: Aug. 28, 2008

(65) Prior Publication Data
US 2010/0007749 A1    Jan. 14, 2010

(30) Foreign Application Priority Data

Feb. 19, 2007 (JP) ................................. 2007-038021

(51) Int. Cl.
*H04N 5/225* (2006.01)
*H04N 5/76* (2006.01)

(52) U.S. Cl.
USPC ..................................... 348/207.1; 348/231.1

(58) Field of Classification Search
None
See application file for complete search history.

(56) References Cited

U.S. PATENT DOCUMENTS

| 6,580,460 | B1 * | 6/2003 | Takahashi et al. | 348/372 |
| 7,315,323 | B2 * | 1/2008 | Ito | 348/207.1 |
| 7,495,690 | B2 * | 2/2009 | Fujimura | 348/207.2 |
| 7,605,849 | B1 * | 10/2009 | Hatanaka | 348/231.2 |
| 7,764,308 | B2 | 7/2010 | Kusaka et al. | |
| 2002/0158863 | A1 * | 10/2002 | Huh et al. | 345/211 |
| 2002/0191079 | A1 * | 12/2002 | Kobayashi et al. | 348/207.1 |

(Continued)

FOREIGN PATENT DOCUMENTS

| JP | A 2000-232599 | 8/2000 |
| JP | A 2002-320116 | 10/2002 |

(Continued)

OTHER PUBLICATIONS

May 1, 2012 Office Action issued in Japanese Patent Application No. 2007-038021 (with translation).

*Primary Examiner* — Sinh Tran
*Assistant Examiner* — Jason Flohre
(74) *Attorney, Agent, or Firm* — Oliff & Berridge, PLC

(57) ABSTRACT

An electronic camera includes a wireless communication means for connecting to a wireless network; a transfer control means for transferring a captured image to a server through the wireless network connected by the wireless communication means; a power supply judgment means for judging whether or not power supply from outside has started; and a power source switching means for switching a power source of the electronic camera to ON or OFF. When the power source of the electronic camera has been switched to OFF by the power source switching means and if it has been judged by the power supply judgment means that supply of the power has started, the transfer control means transfers the captured image to the server, and when the power source of the electronic camera has been switched to ON by the power source switching means and if it has been judged by the power supply judgment means that supply of the power has started, the transfer control means prohibits transfer of the captured image to the server.

4 Claims, 8 Drawing Sheets

(56) References Cited

U.S. PATENT DOCUMENTS

| | | |
|---|---|---|
| 2003/0012566 A1* | 1/2003 | Kindaichi ................... 396/56 |
| 2003/0030412 A1* | 2/2003 | Matsuda et al. ............. 320/127 |
| 2004/0257464 A1* | 12/2004 | Pandit et al. ................ 348/373 |
| 2005/0057683 A1* | 3/2005 | Terane ........................ 348/372 |
| 2005/0088528 A1* | 4/2005 | Sambongi et al. ....... 348/207.11 |
| 2005/0200335 A1* | 9/2005 | Yano ........................... 320/137 |
| 2006/0184705 A1* | 8/2006 | Nakajima .................... 710/303 |
| 2007/0070240 A1* | 3/2007 | Oya ............................. 348/375 |
| 2007/0109420 A1* | 5/2007 | Takeshi .................. 348/211.99 |
| 2008/0074501 A1* | 3/2008 | Matsushima ............ 348/207.11 |

FOREIGN PATENT DOCUMENTS

| | | |
|---|---|---|
| JP | A 2003-23558 | 1/2003 |
| JP | A 2003-23593 | 1/2003 |
| JP | A-2003-348516 | 12/2003 |
| JP | A 2004-312783 | 11/2004 |
| JP | A-2005-051682 | 2/2005 |
| JP | A-2005-080053 | 3/2005 |
| JP | A 2006-115024 | 4/2006 |

* cited by examiner

ELECTRONIC CAMERA

TECHNICAL FIELD

The present invention relates to an electronic camera that transfers a captured image to a server over a wireless network.

BACKGROUND ART

A digital camera is known which transfers image data that has not yet been transferred to a user terminal whose address has already been set by detecting an access point of a wireless LAN that can be connected to the user terminal and connecting the user terminal to the detected access point (see Patent Literature 1).

Patent Literature 1: Japanese Laid-Open Patent Publication No. 2006-115024

SUMMARY OF THE INVENTION

Problem to be Solved by the Invention

The digital camera disclosed in Patent Literature 1 judges whether to transfer a non-transferred image based on an instruction from the user and transfers the non-transferred image when a judgment has been made to transfer it. Therefore, the user has to give an instruction each time. This is cumbersome.

Means for Solving the Problem

The electronic camera according to a first aspect of the present invention comprises a wireless communication means for connecting to a wireless network; a transfer control means for transferring a captured image to a server through the wireless network connected by the wireless communication means; a power supply judgment means for judging whether or not power supply from outside has started; and a power source switching means for switching a power source of the electronic camera to ON or OFF; wherein when the power source of the electronic camera has been switched to OFF by the power source switching means and if it has been judged by the power supply judgment means that supply of the power has started, the transfer control means transfers the captured image to the server, and when the power source of the electronic camera has been switched to ON by the power source switching means and if it has been judged by the power supply judgment means that supply of the power has started, the transfer control means prohibits transfer of the captured image to the server.

According to a second aspect of the present invention, it is preferred that the electronic camera according to the first aspect further comprises a transfer judgment means for judging whether or not each image file of the captured image has already been transferred to the server based on an archive bit set for the each image file, wherein the transfer control means transfers to the server image files except for image files that are judged to have already been transferred to the server by the transfer judgment means.

According to a third aspect of the present invention, the electronic camera according to the first or the second aspect further comprises a power cutting means for turning the power source of the electronic camera OFF after the transfer control means has transferred the captured image to the server.

Advantageous Effect of the Invention

According to the present invention, captured images can be transferred from the digital camera at appropriate timing without any instruction by the user.

BEST MODE FOR CARRYING OUT THE INVENTION

1. Construction

Figure 1:
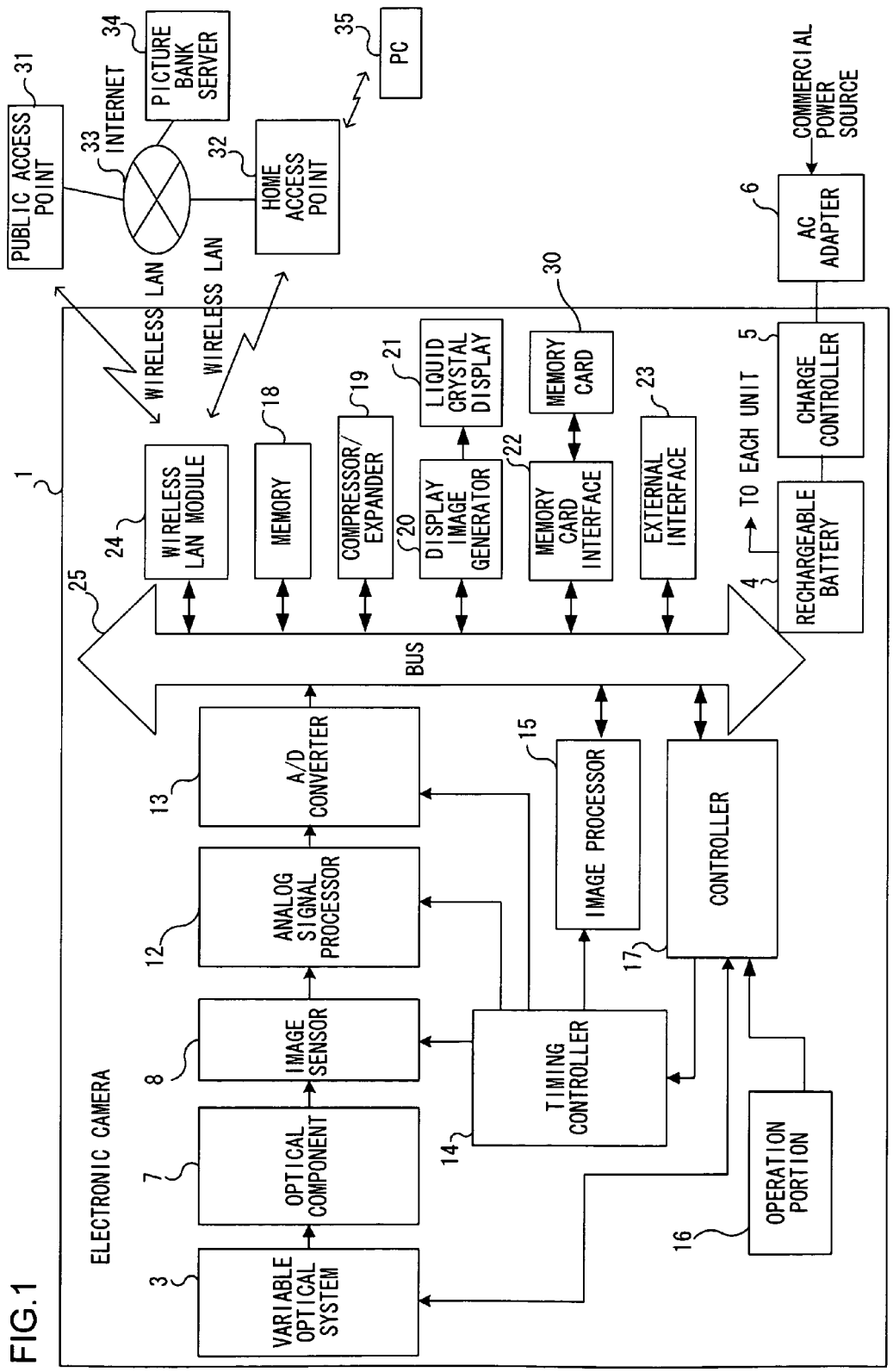
FIG. 1 is a configuration diagram showing an image transfer system according to an embodiment of the present invention.

FIG. 1 shows the configuration of the image transfer system according to an embodiment of the present invention. An electronic still camera (hereafter an electronic camera) 1 with a function of wireless LAN connection is connected to a public access point 31 or a home access point 32 through a wireless LAN. The type of connection of the wireless LAN in this case is called an infrastructure mode. The public access point 31 and the home access point 32 are connected to the Internet 33. A picture bank server 34 is connected to the Internet 33.

The public access point 31 is installed at sites available to the public such as airports, stations, hotels, and restaurants. The public access points 31 include paid ones for which a charge is incurred when they are used and free ones. When connection is established to a paid public access point, user authentication is performed in order to judge whether the user is a normal user based on predetermined account information. The account information, which consists of a user name and a password, can be obtained when the user of the electronic camera 1 applies for service to the service provider in advance with paying a predetermined fee. On the other hand, when the user of the camera 1 establishes connection to a free public access point, no user authentication using such account information is performed.

The manufacturer or sales company of the electronic camera 1 often is under engagement with a specified service provider on free use of the service for a predetermined period of time for the promotion of sales of the electronic camera 1. The access point information including account information of the public access point provided by the service provider is registered in the electronic camera 1 in advance as free-plan access point information. Accordingly, the user of the electronic camera 1 can use the public access point freely for a predetermined period of time even if it is payable under normal conditions. A plurality of types of such free-plan access point information differing in contents from area to area of shipment destination of the electronic camera 1 is registered.

The home access points 32 are installed in homes or offices, which are available only to the users and related persons. A PC (personal computer) 35 besides the electronic camera 1 is connected to the home access point 32 through a wireless LAN.

A picture bank server 34 includes a recording device that records and stores image files transferred from the electronic camera 1. That is, when respective image files of images captured by the electronic camera 1 are transferred from the electronic camera 1 to the picture bank server 34 through the wireless LAN and the Internet 33, the image files are recorded in the recording device of the picture bank server 34. On this occasion, the image file is temporarily recorded in a temporary folder set for the individual electronic camera 1 in the recording device in the picture bank server 34 if it is before the user registration to be detailed later is performed. On the other hand, after the registration of the user has been completed, the image file is recorded in a user folder set for each user when the registration of the user was made in the recording device of the picture bank server 34. This enables storage of the images captured by the electronic camera 1 in the picture bank server 34 without using the PC 35.

The user can view the image files stored in the picture bank server 34 by accessing the picture bank server 34 using the PC 35. If necessary, the user can download the image files stored in the picture bank server 34 to the PC 35 or transfer them to another server.

The electronic camera 1 includes a variable optical system 3, a rechargeable battery 4, a charge controller 5, an optical component 7, an image sensor 8, an analog signal processor 12, an A/D converter 13, a timing controller 14, an image processor 15, an operation portion 16, a controller 17, a memory 18, a compressor/expander 19, a display image generator 20, a liquid crystal display 21, a memory card interface 22, an external interface 23, and a wireless LAN module 24.

The rechargeable battery 4 supplies to each unit of the electronic camera 1 power necessary for the operation thereof. The supply of power from the rechargeable battery 4 to each unit of the electronic camera 1 is allowed or prohibited depending on the state in which the electronic camera 1 is operated. The control of the state of power supply is performed by the controller 17.

The charge controller 5 performs control of charging of the rechargeable battery 4. When an AC adapter 6 is inserted into the power source socket in a state where the AC adapter is connected to the electronic camera 1, the AC commercial power source supplied from the power source socket is converted by the AC adapter 6 into a DC current, which is then output to the charge controller 5. Then, the charge controller 5 charges the rechargeable battery 4 with the DC current. As a result, the rechargeable battery 4 is charged using the power supplied from outside. When the rechargeable battery 4 is fully charged, the charge controller 5 stops the charging.

The variable optical system 3 includes a photographic lens consisting of a plurality of optical lenses, an aperture, and a shutter and so on. The optical unit 7 is constituted by an optical filter and a cover glass and so on. A light flux from a subject, which is passed through the variable optical system 3 and the optical unit 7, forms a subject image on the image sensor 8.

The image sensor 8 captures the subject image formed by the variable optical system 3 and outputs an image signal (captured image signal) corresponding to the captured subject image. The image sensor 8 includes a plurality of pixels and sequentially outputs image signals, which are analog signals, corresponding to the charges stored in respective pixels to the analog signal processor 12 pixel by pixel. The image sensor 8 is constituted by, for example, a single plate CCD. The analog signal processor 12 includes a CDS (correlated double sampling) circuit, an AGC (auto gain control) circuit or the like inside thereof and performs predetermined analog processing on the image signals input therein. The A/D converter 13 converts the analog signals processed by the analog signal processor 12 into digital signals. The timing controller 14 is controlled by the controller 17 and controls the timing of each of the operations of the image sensor 8, the analog signal processor 12, the A/D converter 13, and the image processor 15.

The memory card interface 22 performs interface processing with a memory card (card-shaped removable memory) 30 set inside the electronic camera 1. The external interface 23 performs interface processing with an external device connected through a predetermined cable according to a communication protocol such as USB. The wireless LAN module 24 performs format conversion, encoding, modulation/demodulation, frequency conversion, and the like of data under control by the controller 17 and transmits and receives radio waves between the module 24 and the public access point 31 or the home access point 32. This allows for connection of the electronic camera 1 to the wireless LAN that includes the public access point 31 or the home access point 32.

The operation portion 16 includes various types of operation buttons and switches, specific examples of which include a power switch, a release button, a mode dial, a replay button, an orientation button, a menu button, a decision button, a cancel button, a deletion button, and a help button and so on. The power switch is to switch the power of the electronic camera 10N or OFF. The mode dial is a selection dial for switching the shooting mode or operation mode of the electronic camera 1.

The replay button is a button for displaying a replay image on the liquid crystal display 21. The orientation button is a button for moving the selected position in an operation screen displayed on the liquid crystal display 21. The menu button is a button for displaying a menu screen on the liquid crystal display 21. The decision button is a button for deciding the operation. The cancel button is a button for canceling, for example, the content of operation in an immediately preceding instruction. The deletion button is a button for deleting unnecessary image or the like. The help button is a button for displaying more detailed information or the like. It may be constructed such that a plurality of functions is assigned to one button and the functions are selectively used depending on the state in which the electronic camera 1 is operated.

The liquid crystal display 21 is a display device that displays various types of operation screens depending on the state in which the electronic camera 1 is operated, displays a subject image captured by the image sensor 8, or displays a replay image based on the image data stored in a memory card. The output of the operation portion 16 is input into the controller 17. The output of the display image generator 20 is input into the liquid crystal display 21. The image processor 15 is constituted by, for example, a single-chip microprocessor dedicated for image processing. A flash memory is used as the memory 18, in which software for controlling the electronic camera 1 or data such as access point information to be detailed later are recorded.

The A/D converter 13, the image processor 15, the controller 17, the memory 18, the compressor/expander 19, the display image generator 20, the memory card interface 22, the external interface 23 and the wireless LAN module 24 are connected to each other through a bus 25.

When the operation portion 16 is operated by the user to select the shooting mode and push the release button in the electronic camera 1 having the construction as shown in FIG. 1, the controller 17 controls the variable optical system 3 to perform focus adjustment and the timing controller 14 performs timing control on the image sensor 8, the analog signal processor 12, and the A/D converter 13. Then, the shooting of the subject is performed. It may be constructed such that a plurality of shooting modes can be selected depending on the type of subject and the timing of shooting may be controlled depending on the shooting mode. When a movie shooting mode is selected, a movie image of the subject can be shot.

The image sensor 8 generates an image signal corresponding to a subject image formed in an imaging region by the variable optical system 3. The image signal is subjected to predetermined analog signal processing by the analog signal processor 12 and is output to the A/D converter 13. In the A/D converter 13, the image signal having undergone the analog signal processing by the analog signal processor 12 is digitalized and supplied to the image processor 15 as image data.

In the electronic camera 1 according to the present embodiment, R (red), G (green), and B (blue) color filters are in Bayer arrangement in the image sensor 8. Therefore, the image data supplied from the image sensor 8 to the image processor 15 are indicated in the RGB color coordinate system and each pixel that constitutes the image data has information on any one of color components R, G, and B.

The image processor 15 performs image processing such as interpolation, gradation conversion, or edge enhancement on such image data. The image data on which such image processing has been completed is recorded in image file units in a memory card 30 through the memory card interface 22. On this occasion, predetermined compression processing is performed on the image data by the compressor/expander 19 as necessary. As a result, the captured image is recorded in the electronic camera 1. On the image data for which image processing has been completed, interpolation processing has also been completed, so that each pixel constituting the image data has color information of all the color components R, G, and B.

The image data recorded in the memory card 30 is wirelessly transmitted from the wireless LAN module 24 to the public access point 31 or the home access point 32 in response to the operation by the user. The wireless transmission is performed in accordance with the general signal standard of wireless LAN, for example, the standard of IEEE 802.11b or IEEE 802.11g. The wireless transmission may be performed in accordance with International standard WiFi (Wireless Fidelity) authentication.

The public access point 31 and the home access point 32 relay the image data transmitted from the wireless LAN module 24 in the electronic camera 1 and transfer the data to the picture bank server 34 through the Internet 33.

As mentioned above, the electronic camera 1 is connected to the wireless LAN by connecting the wireless LAN module 24 to the public access point 31 or the home access point 32. As a result, the electronic camera 1 and the picture bank server 34 are connected to each other through the wireless LAN. Then, the electronic camera 1 selects images not yet transferred to the picture bank server 34 from among the captured images recorded in the memory card 30 and transfers them to the picture bank server 34. In this manner, the images captured by the electronic camera 1 are transferred to the picture bank server 34. When captured images are transferred from the electronic camera 1, a well-known communication protocol called PTPIP (Picture Transfer Protocol over Internet Protocol) is used.

2. Setting of Wireless LAN

Next, a method of setting a wireless LAN is explained. As explained above, by connecting the electronic camera 1 to the public access point 31 or the home access point 32 by the wireless LAN module 24, image shot by the electronic camera 1 is transferred to the picture bank server 34. In order to perform such a connection by using the wireless LAN, it is necessary to record access point information for each access point to be connected in the electronic camera 1 in advance. The access point information includes various pieces of information such as an access point name, SSID (Service Set Identifier) of wireless LAN, a method of obtaining an IP address, an authentication method, type of encryption mode and content of encryption key used upon authentication, account information (user name and password), and access point type (public wireless LAN or home wireless LAN). The access point information is stored and saved in the memory 18 so that it should not be erased when the power of the electronic camera 1 is cut off.

The registration of access point information is performed in a state where the electronic camera 1 and the PC 35, which is a terminal, are connected to each other through a cable. On this occasion, the electronic camera 1 is connected to the cable at the external interface 23. When the user operates a mode dial of the electronic camera 1 to adjust it to the position "SETUP" in a state where the electronic camera 1 and the PC 35 are connected to each other through the cable, a software program for setting a wireless LAN installed in the PC 35 in advance is executed. As a result, the access point information set in the PC 35 is transmitted from the PC 35 to the electronic camera 1.

The electronic camera 1 receives the access point information transmitted from the PC 35 through the cable as mentioned above and acquires it by the external interface 23. Under control of the controller 17, the electronic camera 1 writes the content of the information in the memory 18 to store and save it. This allows the access point information to be registered in the electronic camera 1.

Alternatively, the access point information may be registered directly in the electronic camera 1 without connecting the electronic camera 1 to the PC 35. This type of registration of access point can be performed by the user by operating the operation portion 16. That is, an input operation by the user is detected by the operation portion 16 and the access point information is set by the controller 17 based on the input operation. In this manner, the access point information set based on the input operation by the user is stored in the memory 18.

As free-plan access point information, access point information for allowing free connection to the public access point of the provider with whom free access contract for a predetermined period of time has been concluded as mentioned above has been registered in the electronic camera 1 in advance. The free-plan access point information like other access point information is stored in the memory 18. Therefore, by using the free-plan access point information, the user can connect the electronic camera 1 to the public access point 31 and transmit the captured image to the picture bank server 34 without registration of the access point information.

When the free-plan access point information is used, it is not always possible to use all pieces of the free-plan access point information registered in advance in the electronic camera 1. Only the free-plan access point information corresponding to the shipment area set in advance for the electronic camera 1 can be used but the free-plan access point information corresponding to other shipment area cannot be used. On this occasion, any one of a plurality of types of access point information stored in the memory 18 is selected by the controller 17 as usable access point information based on the shipment area set in advance in the electronic camera 1. Other information than that selected in this manner cannot be used even though registered in the electronic camera 1. Much less the content of such cannot be displayed on the liquid crystal display 21.

As a result, if the electronic camera 1 sold in a foreign country and brought into Japan, it is possible to prohibit the electronic camera 1 from using the free-plan access point information for domestic services. As a result, the manufacturer and sales company of the electronic camera 1 can avoid problems on agreements with the service providers. That is, when an agreement is made that the wireless LAN connection service shall be available freely to only the electronic cameras 1 sold in Japan, the contents of the agreement can be observed even if the electronic cameras 1 sold in foreign countries are brought into Japan.

The controller 17 controls the wireless LAN module 24 based on the access point information explained above to connect the wireless LAN module 24 to the public access point 31 or the home access point 32. The controller 17 controls such that a non-transmitted captured image is transmitted to the picture bank server 34 through the access point connected to the wireless LAN module 24. In this manner, the electronic camera 1 is connected to the picture bank server 34 through the wireless LAN and the image captured by the electronic camera 1 is transmitted to the picture bank server 34.

3. Picture Bank Transfer Processing

Figure 2:
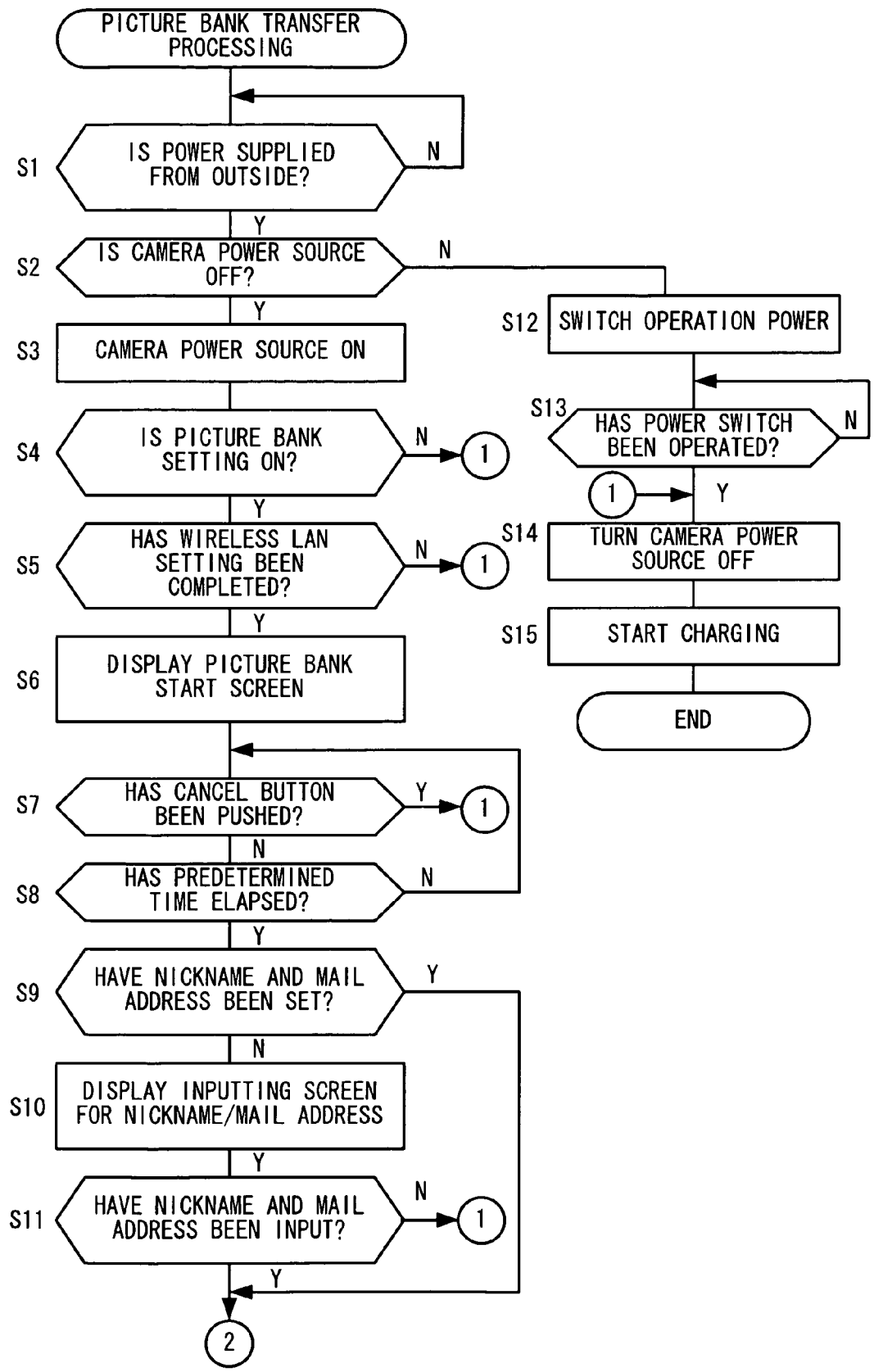
FIG. 2 is a part of a flowchart illustrating picture bank transfer processing performed by an electronic camera.
Figure 3:
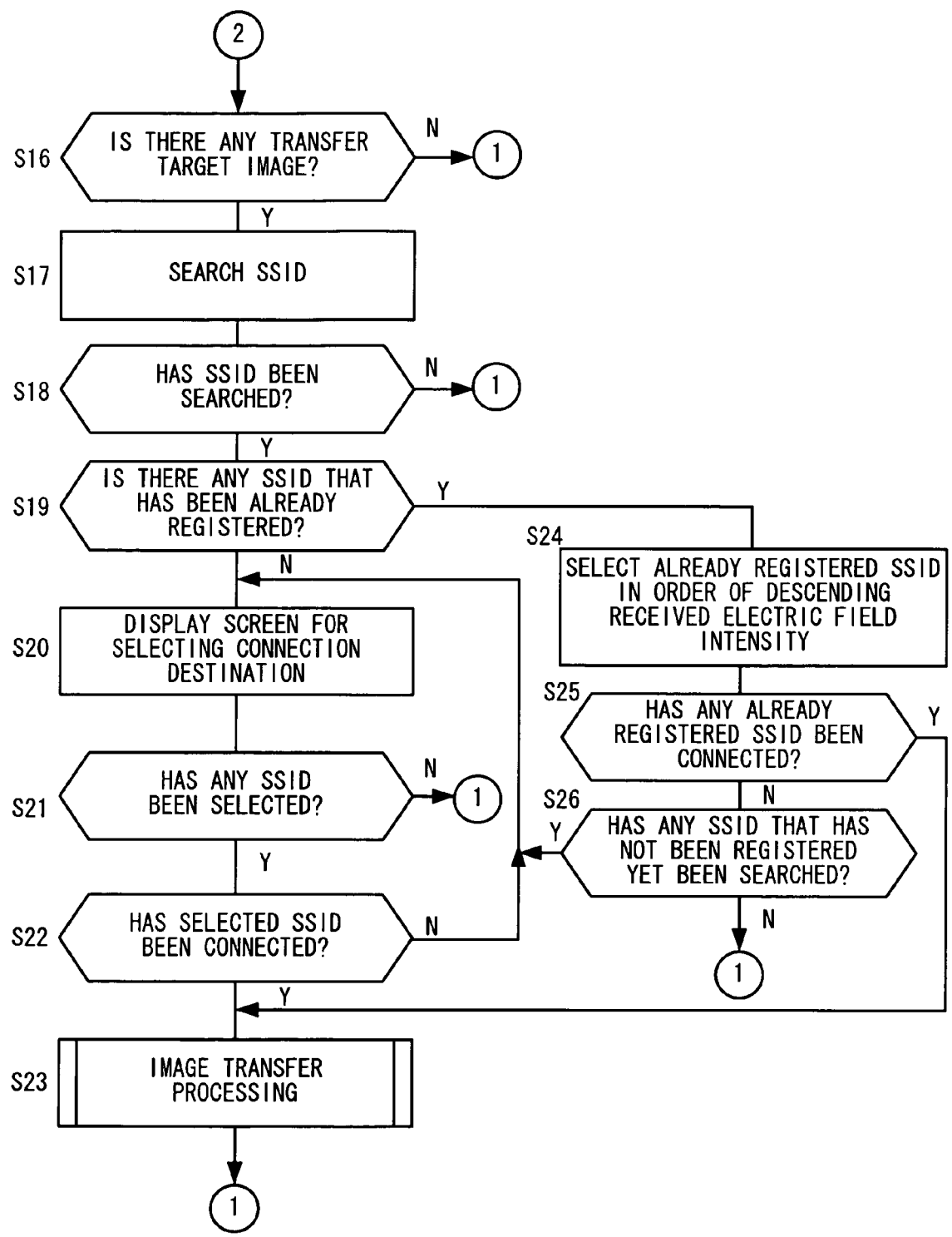
FIG. 3 is shows a part of the flowchart illustrating the picture bank transfer processing performed by the electronic camera other than the part shown in FIG. 2.

Next, explanation is made on picture bank transfer processing performed by the electronic camera 1 when a captured image is transferred to the picture bank server 34 by connecting the electronic camera 1 to the public access point 31 or the home access point 32 via wireless LAN. FIGS. 2 and 3 shows a flowchart illustrating picture bank transfer processing performed by the controller 17 of the electronic camera 1. Hereafter, the content of the picture bank transfer processing is explained referring to the flowchart.

In step S1 in FIG. 2, it is judged whether power for charging the rechargeable battery 4 is supplied from outside to the electronic camera 1. If the power is supplied from outside, that is, if the electronic camera 1 is connected to the AC adapter 6 inserted in the power socket and commercial power source converted into a DC current by the AC adapter is input to the charge controller 5 to start supply of power, the procedure proceeds to next step S2.

In step S2, it is judged whether the power of the electronic camera 1 is OFF. If it has been judged that the power of the electronic camera 1 is OFF, that is, if the power of the electronic camera 1 is switched OFF by a power source switch provided in the operation portion 16, the procedure proceeds to step S3. On the other hand, if it has not been judged that the power of the electronic camera 1 is OFF, that is, if the power of the electronic camera 1 is switched ON by the power source switch provided in the operation portion 16, the procedure proceeds to step S12. On this occasion, image transfer from the electronic camera 1 to the picture bank server 34 is not performed. With this construction, if it has been judged that power is supplied from outside when the power of the electronic camera 1 is switched ON, transfer of the captured image is prohibited.

In step S3, the power of the electronic camera 1 is switched from OFF to ON. In subsequent step S4, it is judged whether the setting of the picture bank in the electronic camera 1 is ON. If the setting of the picture bank is ON, the procedure proceeds to step S5. On the other hand, if the setting of the picture bank is OFF, the procedure proceeds to step S14. Also in this case, image transfer from the electronic camera 1 to the picture bank server 34 is not performed.

The setting of the picture bank in the electronic camera 1 is made in advance by the operation of the operation portion 16 by the user to a state of either ON or OFF. That is, when it is desired to enable the image transfer processing to the picture bank server 34, the user sets the picture bank ON. On the contrary, when it is desired to prohibit the image transfer processing to the picture bank server 34, the user sets the picture bank OFF.

The image transfer to the picture bank server 34 can be performed at any timing regardless of whether the setting of the picture bank is ON or OFF by selection on the menu screen by the user. However, explanation on the contents of the processing on this occasion is omitted. That is, in the following, explanation is made on the picture bank server transfer processing that is automatically performed in the electronic camera 1 when the electronic camera 1 is connected to the AC adapter 6 and power supply from outside is started.

In step S5, it is judged whether the setting of wireless LAN has been completed in the electronic camera 1. On this occasion, when at least one piece of the above-mentioned access point information is registered, the setting of wireless LAN is judged to have been completed and the procedure proceeds to step S6. On the other hand, when no access point information has been registered, the setting of wireless LAN is not judged to have been completed and the procedure proceeds to step S14. Also on this occasion, image transfer from the electronic camera 1 to the picture bank server 34 is not performed.

In step S5, the free-plan access point information that has been registered in advance in the electronic camera 1 is usually exempted from the target of judgment. However, the judgment may be performed including the free-plan access point information. That is, on this occasion, it is always judged in step S5 that the setting of wireless LAN has been completed.

When the procedure proceeds from step S5 to step S6, a picture bank start screen is displayed on the liquid crystal display 21 in order to notify the user of the electronic camera 1 of the start of the picture bank transfer processing. In next step S7, it is judged whether the cancel button of the operation portion 16 has been pushed by the user. If the cancel button has been pushed, the procedure proceeds to step S14. Also on this occasion, image transfer from the electronic camera 1 to the picture bank server 34 is not performed. If the cancel button has not been pushed, the procedure proceeds to step S8.

In step S8, it is judged whether a predetermined time has passed since the picture bank start screen was displayed in step S6. Until a predetermined time, for example, 5 seconds has passed, the procedure returns to step S7 and the judgment whether the cancel button has been pushed is continued. When the predetermined time has passed without any push of the cancel button, the procedure proceeds to step S9. As a result, when the predetermined time has passed, the procedure proceeds to next processing even when there was no operation by the user so that image transfer to the picture bank server 34 can be performed.

In step S9, it is judged whether a nickname and a mail address of the user have been set in the electronic camera 1. The nickname and address are transmitted from the electronic camera 1 to the picture bank server 34 when a captured image is transferred. If the nickname and mail address have not been set, the procedure proceeds to step S10. On the other hand, if they have been already set, the procedure proceeds to step S16 in FIG. 3.

In step S10, an input screen for inputting a nickname and a mail address of the user is displayed on the liquid crystal display 21. The user can input any nickname and mail address by operating the operation portion 16 while the input screen is being displayed. Once the nickname and mail address have been input, their information is stored in the memory 18, so that it is unnecessary to input them again next time.

In step S11, it is judged whether a nickname and a mail address have been input by the operation of the user in the input screen for inputting a nickname and a mail address displayed in step S10. If they have been input, the procedure proceeds to step S16 in FIG. 3. On the other hand, if no operation has been performed by the user and input of a nickname and a mail address has not been performed for a predetermined period of time, the procedure proceeds to step S14. Also on this occasion, image transfer from the electronic camera 1 to the picture bank server 34 is not performed.

In step S16 in FIG. 3, it is judged whether there is an image that is a target of transfer in the electronic camera 1. If there is an image as a target of transfer, the procedure proceeds to next step S17. On the other hand, if there is no image as a target of transfer, the procedure proceeds to step S14. For example, when no captured image is recorded in the memory card 30, or when there is no non-transferred captured image in the memory card 30, or when the memory card 30 is locked to prohibit access thereto, it is judged in step S16 that there is no image as a target of transfer. When it has been judged that there is no image as a target of transfer, image transfer from the electronic camera 1 to the picture bank server 34 is not performed.

In step S17, SSID search is performed. By the SSID search, SSIDs can be searched that correspond to access points to which communication is possible through the wireless LAN module 24 and the wireless LAN. On this occasion, some access points may have a function to make their SSIDs secret to wireless terminals in which their SSIDs have not been set. Search of such secret SSIDs is performed based on the information on the SSIDs registered in the access point information. That is, only those access points whose SSIDs have been registered in the access point information are qualified as targets of search for SSIDs. In this manner, access points that are capable of performing wireless communication with the wireless LAN module 24 are searched.

In step S18, it is judged whether SSIDs have been searched in step S17. If there has been searched at least one SSID of access point that is capable of communication through wireless LAN, the procedure proceeds to step S19. On the other hand, no SSID of access point that is capable of communication through wireless LAN has been searched, the procedure proceeds to step S14. Also on this occasion, image transfer from the electronic camera 1 to the picture bank server 34 is not performed.

In step S19, it is judged whether there is in the SSIDs searched in step S17 an SSID that has already been registered in the electronic camera 1. If there is an already registered SSID, that is, if there has been searched at least one SSID of an access point of which the access point information has been registered in the electronic camera 1, the procedure proceeds to step S24. The already registered SSIDs may include those SSIDs registered in the free-plan access point information. On the other hand, if there is no SSID that has already been registered in the searched SSIDs, the procedure proceeds to step S20.

When the procedure proceeds to step S19 to step S20, a connection target selection screen for selecting the target to which the electronic camera 1 is to be connected is displayed on the liquid crystal display 21 in step S20. On the connection target selection screen, a list of SSIDs searched in step S17 is displayed.

In step S21, it is judged whether any SSID has been selected as a target to which the electronic camera 1 is to be connected on the connection target selection screen displayed in step S20. If any one of SSIDs listed on the connection target selection screen is selected by input operation by the user, an access point corresponding to the SSID is set as a target of connection of the electronic camera 1 and the procedure proceeds to step S22. On the other hand, if no operation has been performed by the user and no selection of target of connection has been performed for more than a predetermined period of time, the procedure proceeds to step S14. Also on this occasion, image transfer from the electronic camera 1 to the picture bank server 34 is not performed.

In step S22, it is judged whether the electronic camera 1 could be connected to the selected SSID. If the connection has been established to the selected SSID, the procedure proceeds to step S23, in which image transfer processing is performed. The content of the image transfer processing is explained in detail later. With this processing, the captured images are transferred from the electronic camera 1 to the picture bank server 34. After the processing in step S23 is performed, the procedure proceeds to step S14 in FIG. 2.

On the other hand, if it has been judged in step S19 that there is an SSID that has been already registered in the electronic camera 1 among the selected SSIDs, the already registered SSID is automatically selected as a destination of connection in step S24. On this occasion, if there has been searched a plurality of already registered SSIDs, the already registered SSIDs are automatically selected in order of descending reception electric field intensity of radio waves received by the wireless LAN module 24, that is, in order of descending goodness of wireless connection environment. If connection to any one of the already registered SSIDs that have been searched has failed with this process, connection to another already registered SSID will be tried.

In step S25, it is judged whether the electronic camera 1 has been successfully connected to the already registered SSID that has been selected in step S24. If the connection to the selected SSID has been successful, the procedure proceeds to step S23, in which image transfer processing is performed. With this procedure, the captured images are transferred from the electronic camera 1 to the picture bank sever 34. After the processing in the step S23 has been performed, the procedure proceeds to step S14. On the other hand, if it has been unsuccessful to connect to any already registered SSID, the procedure proceeds to step S26.

In step S26, it is judged whether any SSID that has not been registered in the electronic camera 1 has been searched when SSIDs were searched in step S17. If some SSIDs that have not yet registered have been searched, the procedure proceeds to step S20, in which a connection target selection screen displaying a list of the non-registered SSIDs is displayed on the liquid crystal display 21. Thereafter, the above-mentioned processing in step S21 and S22 is performed to connect the electronic camera 1 to the SSID selected by the input operation by the user and then image transfer processing in step S23 is performed. On the other hand, no SSID that was not yet registered in step S17 has been searched, the procedure proceeds to step S14. Also on this occasion, image transfer from the electronic camera 1 to the picture bank server 34 is not performed.

Next, explanation is made on the case where the power of the electronic camera 1 was ON when the power supply from outside was started, that is the processing when the procedure proceeds from step S2 to step S12 in FIG. 2. In this case, in step S12, the operation power used in the electronic camera 1 is switched. That is, the power for actuation, which has been supplied to each component of the electronic camera 1 from the rechargeable battery 4, is now switched so that it is supplied from the AC adapter 6. With this construction, the electronic camera 1 is switched from the battery operation to the external power operation.

In step S13, it is judged whether the power switch in the operation portion 16 has been operated by the user after the electronic camera 1 is switched to the external power operation in step S12. If the power switch has been operated, that is, there has been an instruction to turn the power OFF from the user, the procedure proceeds to step S14.

When the procedure proceeds from step S13 to step S14, or from steps S4, S5, S7, S11, S16, S18, S21, S23 or S26 to step S14, the power of the electronic camera 1 is turned OFF in step S14. With this construction, when the processing in step S14 is performed after the image transfer processing has been performed in step S23, the power of the electronic camera 1 is automatically turned OFF after the image captured by the electronic camera 1 has been transferred to the picture bank server 34. In another case, the power of the electronic camera 1 is turned OFF without transferring the captured image.

In step S15, charging of the rechargeable battery 4 is started. After the power of the electronic camera 1 is turned OFF and the charging of the rechargeable battery 4 has been started in this manner, the controller 17 ends the flowchart shown in FIGS. 2 and 3 to complete the picture bank transfer processing. Thereafter, the charging of the rechargeable battery 4 is controlled by the charge controller 5 as mentioned above.

Because of the processing performed by the controller 17 as mentioned above, the images captured by the electronic camera 1 are transferred to the picture bank server 34 through the wireless LAN.

4. Image Transfer Processing

Figure 4:
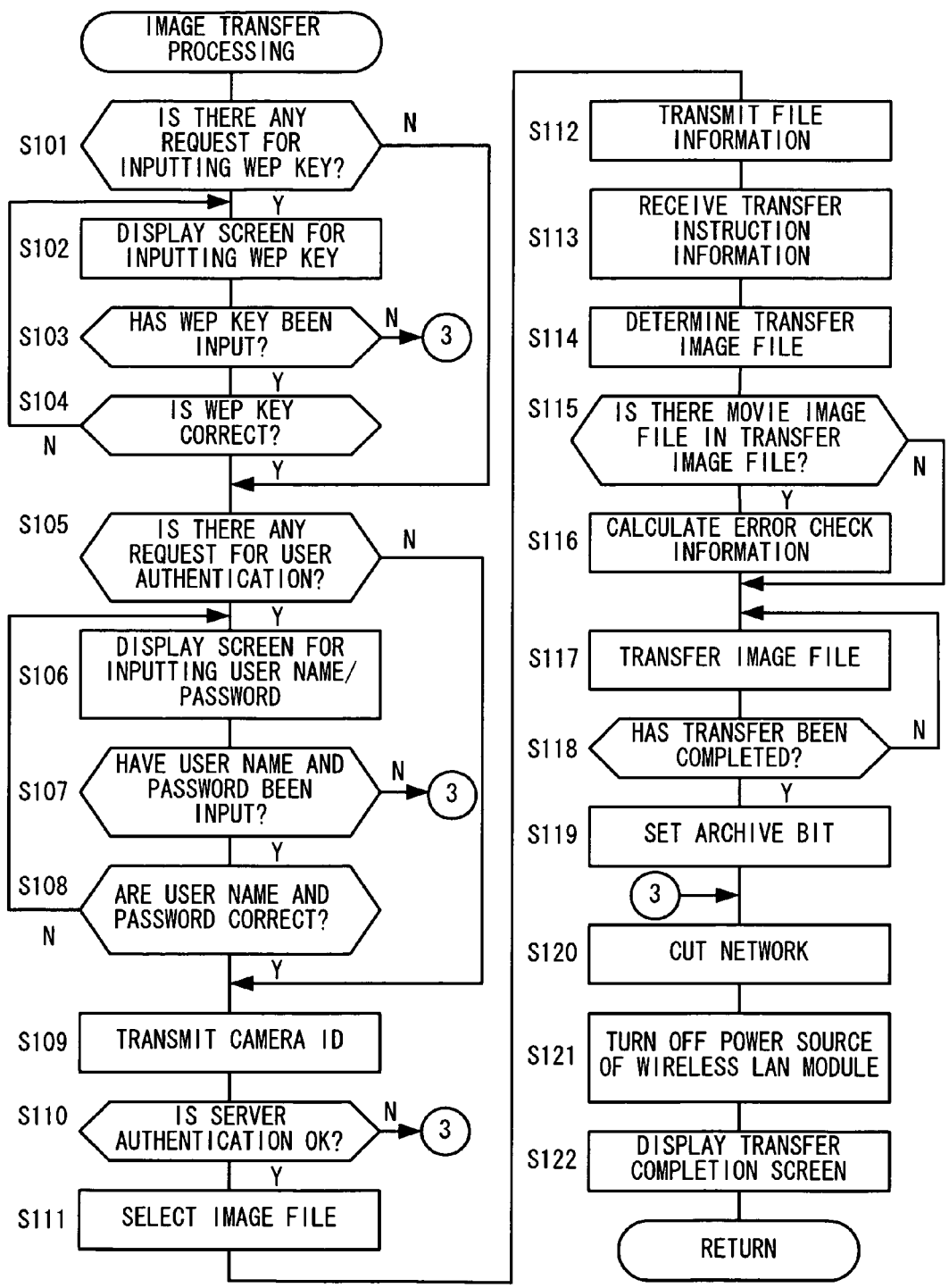
FIG. 4 is a flowchart illustrating image transfer processing.

Next, explanation is made on specific contents of the image transfer processing performed in step S23 in FIG. 3. FIG. 4 is a flowchart illustrating the image transfer processing.

In step 101, it is judged whether there has been a request for inputting a WEP (Wired Equivalent Privacy) key, which is a cryptography key for being allowed to connect to an access point corresponding to the SSID selected as a connection target. A cryptography key of another cryptographic type may be used instead of the WEP key. If there has been a request for inputting a WEP key, the procedure proceeds to step S102 whereas if there has been none, the procedure proceeds to step S105.

In step S102, a WEP key inputting screen for inputting a WEP key is displayed on the liquid crystal display 21. The user can input any WEP key into the electronic camera 1 by operating the orientation button or the like on the WEP key inputting screen.

In step S103, it is judged whether a WEP key has been input by the operation of the user on the WEP key inputting screen displayed in step S102. If the WEP key has been input, the procedure proceeds to step S104. On the other hand, if no operation has been performed by the user and input of the WEP key has not been performed for a predetermined period of time, the procedure proceeds to step S120. On this occasion, image transfer from the electronic camera 1 to the picture bank server 34 is not performed.

In step S104, it is judged whether a correct WEP key has been input by the user in step S103. If the input WEP key is incorrect, the procedure returns to step S102 and the user is invited to input a correct WEP key. On the other hand, if a correct WEP key has been input, the procedure proceeds to step S105. In this manner, authentication of the WEP key is performed. The user can also stop inputting the WEP key during the inputting of the WEP key by pushing the cancel button.

If a correct WEP key has previously been input by the user to the access point, the content of the WEP key is stored in the electronic camera 1. Therefore, in that case, even when the input of a WEP key has been requested by the access point, the authentication of the WEP key is performed by performing the judgment in step S104 using that WEP key without displaying the WEP key inputting screen. Similarly, when the content of a WEP key has been recorded in the access point information, the authentication of the WEP key is performed using that WEP key without displaying the WEP key inputting screen.

In step S105, it is judged whether there has been a request from the access point with the SSID selected as a connection target for user authentication for connection therewith. The user authentication is performed so that only connections by legitimate users can be allowed at the public access point 31. If there has been a user authentication request, the procedure proceeds to step S106 whereas if there has been none, the procedure proceeds to step S109.

In step S106, an inputting screen for inputting a user name and a password is displayed on the liquid crystal display 21. The user can input a user name and a password acquired in advance to the electronic camera 1 by operating the orientation button or the like on the inputting screen.

In step S107, it is judged whether a user name and a password have been input into the inputting screen for inputting a user name and a password displayed in step S106 by the operation by the user. If the user name and the password have been input, the procedure proceeds to step S108. On the other hand, if no operation has been made by the user and there has been no input on the user name and the password for a predetermined period of time, the procedure proceeds to step S120. Also on this occasion, image transfer from the electronic camera 1 to the picture bank server 34 is not performed.

In step S108, it is judged whether a correct user name and a correct password have been input by the user in step S107. If the input user name and password have been incorrect, the procedure returns to step S106 to display again the inputting screen for inputting a user name and a password so that the user is invited to input again a correct user name and a correct password. On the other hand, if a correct user name and a correct password have been input, the procedure proceeds to step S109. In this manner, user authentication is performed. The user can stop inputting the user name and the password during the inputting thereof by pushing the cancel button.

Upon the above-mentioned user authentication, predetermined information is exchanged between the electronic camera 1 and the access point according to a protocol called WISPr (Wireless Internet Service Provider roaming). In the case of the user authentication, like the authentication of a WEP key, if the user has input to the access point a correct user name and a correct password in the past, the contents of the user name and the password are stored in the electronic camera 1. Therefore, in that case, even when the input of a user name and a password is requested by the access point, the user authentication can be performed without displaying the inputting screen for inputting a user name and a password by performing the judgment in step S108 using the stored user name and password. When the contents of the user name and the password are recorded in the access point information, the user authentication is performed by using the user name and the password without displaying the inputting screen for inputting a user name and a password.

When there is a request for inputting a WEP key or a request for user authentication from the access point, the authentication of the WEP key or the user authentication as mentioned above is performed. If the result of such authentication is that the WEP key or the user is correct, the connection to the access point is completed. When the connection to the access point is completed in this manner, the electronic camera 1 is connected through wireless LAN to the picture bank server 34 that is a destination to which the electronic camera 1 transfers the images.

In step S109, a camera ID determined in the electronic camera 1 is transmitted to the picture bank server 34 connected through wireless LAN. The camera ID is used by the picture bank server 34 when it performs user authentication and has contents unique to each electronic camera 1. Therefore, the picture bank server 34 can specify the user who transfers images based on the camera ID transmitted from the electronic camera 1. In this manner, the camera ID for user authentication unique to each electronic camera 1 is transmitted from the electronic camera 1 to the picture bank server 34, which is the destination to which images are to be transferred, prior to transmitting images to the picture bank server 34.

The camera ID can be determined in the electronic camera 1 as follows. For example, a camera ID is determined based on a fixed ID number stored in each electronic camera. For example, a production number of each electronic camera may be used as the ID number. It is preferred that the ID number of each electronic camera is stored in an encrypted state so that the user cannot use others' IDs illegally or the user cannot alter the camera ID illegally. In addition, a separate ID number calculated according to a predetermined algorithm and changed of its content at predetermined timing may be advantageously used in combination with the above-mentioned ID number. In this case, it is necessary for the picture bank server 34 to judge the contents of the camera ID using the same algorithm and at the same timing. In this manner, illegal use or alteration of the camera ID can be prevented more effectively.

In step S110, it is judged whether the result of the server authentication performed by the picture bank server 34 based on the camera ID transmitted in step S109 is OK. If the result of the server authentication is OK, the procedure proceeds to next step S111. On the other hand, if the result of the server authentication is not OK, that is the transmitted camera ID is illegal, or if the user specified by the camera ID is a target to whom use of the service is restricted, the procedure proceeds to step S120. On this occasion, image transfer from the electronic camera 1 to the picture bank server 34 is not performed.

In step S111, selection of image files to be transferred to the picture bank server 34 is performed. Here, among the image files corresponding to the captured images recorded in the memory card 30, an image file that has not yet been transferred is selected. Judgment whether an image file has not been transferred yet is performed based on presence or absence of flag information set at the time of transfer. This flag information is called archive bit. That is, an image file of which an archive bit is set is judged to have already been transferred whereas an image file of which no archive bit is set is judged not to have been transferred yet. As a result, the image file judged to have already been transferred is removed from image files to be transferred.

In step S112, the file information on non-transferred image files selected in step S111 is transmitted to the picture bank server 34. The file information to be transmitted includes type of image file, that is, information indicating whether it is a still image or a movie image, a file name, a data size, and soon. The file information transmitted from the electronic camera 1 is used in the picture bank server 34 for determining the contents of transfer instruction information to be detailed later.

In step S113, transfer instruction information transmitted from the picture bank server 34 based on the file information transmitted in step S112 is received. Based on this transfer instruction information, the electronic camera 1 is instructed by the picture bank server 34 as to which image file is to be transferred. When a movie image file is transferred, it is instructed as to which part of the movie image file is transferred based on the transfer instruction information. That is, instruction is made as to whether the whole movie image file is transferred or it is transmitted from the middle of the file. When the movie image file is transferred from the middle of the file, an instruction is made as to which part of the movie image file, i.e., which number of bytes from the head the transfer starts from.

When a movie image file transfer of which has been previously interrupted is to be transferred again, the picture bank server 34 gives an instruction to indicate a part to be transferred again and transfer the movie image file from the middle thereof or halfway. The indication of the part to be transferred again by the picture bank server 34 on this occasion is performed based on error check information to be detailed later.

In step S114, the image file to be transferred to the picture bank server 34 is decided based on the transfer instruction information received in step S113. Here, the transfer image file is decided according to the instruction of the picture bank server 34. That is, out of the non-transferred image files selected in step S111, only those image files of which transfer has been instructed based on the transfer instruction information are selected as transfer image files. For movie image files, it is decided whether the whole movie image file is to be transferred or it is to be transmitted from the middle of the file according to the contents of the instruction in the transfer instruction information. When it is to be transferred again from the middle thereof, it is decided from which part it is transferred again.

In step S115, it is judged whether there is a movie image file in the transfer image files determined in step S114. If the transfer image files include a movie image file, the procedure proceeds to step S116. On the other hand, if the transfer image files include no movie image file, that is, the decided transfer image files are all still image files, the processing of step S116 is not performed and the procedure proceeds to step S117.

In step S116, error check information for detecting occurrence of errors in transfer in the picture bank server 34 is calculated for the movie image files included in the transfer image files. For example, check sum and various types of error detection codes can be calculated as error check information. On this occasion, the error check information is calculated for every predetermined data amount of the movie image file. For example, the movie image file is sectioned by 10 Mbytes and error check information such as check sum is calculated for each section.

In step S117, transfer of the transfer image files decided in step S114 according to the instruction from the picture bank server 34 is performed. That is, only the image files indicated by the transfer instruction information out of the non-transferred image files selected in step S111 are transferred. For movie image files, the whole file is transferred or the portion indicated by the picture bank server 34 is transferred again according to the contents of the instruction in the transfer indication information. By so doing, when transfer of a movie image has been interrupted in the past and the movie image data is transmitted again, the movie image can be transferred again except for the portion that has already been transferred before the interruption. When a movie image file is transferred, the error check information calculated in step S116 is transmitted to the picture bank server 34 together with the movie image file. In addition, the nickname and mail address of the user set in the electronic camera 1 are also transmitted together with the movie image file.

In step S118, it is judged whether the transfer of image files in step S117 has been completed. Until transfer of all the transfer image files decided in step S114 is completed, the procedure returns to step S117 to continue the transfer of the image files. When transfer of all the designated image files is completed, the procedure proceeds to step S118.

In step S119, an archive bit is set to each of the image file transferred in step S117. The archive bit is flag information that is set to each image file in order to indicate whether the image file has already been transferred as mentioned above. As a result, the archive bit is set to each of the image files of which transfer has been completed. Therefore, when next image transfer processing is performed, the image file with the archive bit is no more selected as non-transferred image in step S111.

In step S120, the network established between the electronic camera 1 and the picture bank server 34 is cut. On this occasion, the wireless LAN module 24 ends wireless communication with the access point selected as a target of connection. This cancels the connection between the electronic camera 1 and the access point through wireless LAN. In next step S121, the power supply to the wireless LAN module 24 is stopped to turn OFF the power of the wireless LAN module 24. In next step S122, a transfer completion screen that indicates completion of the transfer of images on the liquid crystal display 21. When the process in step S122 has been performed, the controller 17 ends the flowchart shown in FIG. 4.

By the processing as mentioned above, the electronic camera 1 and the picture bank server 34 are connected to each other through wireless LAN. Then, a non-transferred image file is selected and is transferred from the electronic camera 1 to the picture bank server 34. When the cancel button is pushed before the image is transferred, a cancel screen is displayed to end the process of the flowchart shown in FIG. 4.

5. Transfer Image Storage Processing

Figure 5:
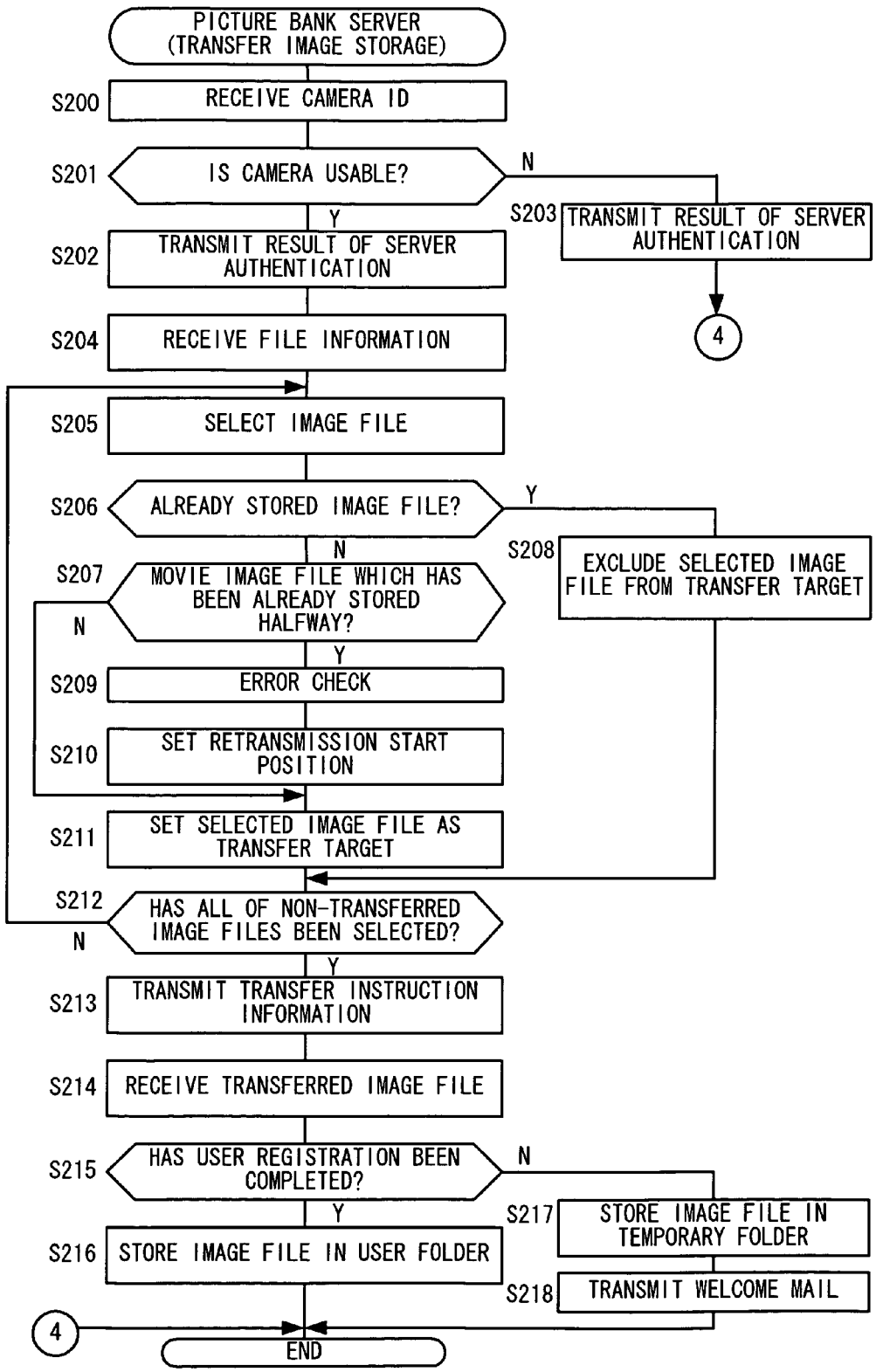
FIG. 5 is a flowchart illustrating transfer image storage processing performed by a picture bank server.

Next, explanation is made on the operation of the picture bank server 34 when a captured image is transferred from the electronic camera 1 to the picture bank server 34. FIG. 5 is a flowchart illustrating the transfer image storage processing that is performed by the picture bank server 34. Hereafter, explanation is made referring to the flowchart shown in FIG. 5.

In step S200, a camera ID is received from the electronic camera 1. The camera ID is transmitted from the electronic camera 1 in step S109 in FIG. 4 as explained above.

In step S201, it is judged whether the electronic camera 1 that transmitted the camera ID is usable based on the camera ID received in step S200. For example, when a camera ID with an illegal content is received or the electronic camera 1 is set in an unlinked state to be detailed later, the electronic camera 1 is judged to be unusable and the procedure proceeds to step S203. On the other hand, when this is not the case, the electronic camera 1 is judged to be usable and the procedure proceeds to step S202.

In step S202 or step S203, the result of the judgment in step S201 is transmitted to the electronic camera 1 as a server authentication result. That is, when the procedure proceeds from step S201 to step S202, a notification that the server authentication result was OK is transmitted to the electronic camera 1. On this occasion, the procedure proceeds to next step S204 after the server authentication result is transmitted. On the other hand, when the procedure proceeds from step S201 to step S203, a notification that the server authentication result was not OK is transmitted to the electronic camera 1. On this occasion, the picture bank server 34 ends the processing in the flowchart shown in FIG. 5 after the server authentication result is transmitted. Therefore, image transfer from the electronic camera 1 to the picture bank server 34 is not performed.

In step S204, file information transmitted from the electronic camera 1 is received. The file information has been transmitted from the electronic camera 1 in step S112 in FIG. 4. As mentioned above, the file information includes type, file name, and data size, and so on of non-transferred image file to be transferred.

In step S205, any one of non-transferred image files represented by file information received in step S204 is selected based on the file information. In next step S206, it is judged whether the image file selected in step S205 is an image file already stored in the picture bank server 34. If the selected image file is an already stored image file, the procedure proceeds to step S208 and the image file is removed from the target of transfer in step S208. Thereafter, the procedure proceeds to step S212. On the other hand, if the image file selected in step S205 has not been stored yet in the picture bank server 34, the procedure proceeds to step S207.

In step S207, it is judged whether the image file selected in step S205 is a movie image file that has been already been stored in the picture bank server 34 to the middle of the movie image file. If the selected image file is not a movie image file that has been stored to the middle of the file, that is, when the selected image file is a still image file or a movie image file that has not yet been stored, the procedure proceeds to step S211. On the other hand, when the image file selected in step S205 is a movie image file that has been already stored to the middle thereof, that is, when the movie image file has been stored to the middle thereof because the transfer was interrupted in the past, the procedure proceeds to step S209.

In step S209, error check is performed on the movie image file that is judged to have already been stored to the middle of the movie image file instep S207. The error check is performed in the picture bank server 34 by collating the result of calculation of error check information calculated for each predetermined amount of data of the movie image file with the error check information transmitted together with the movie image file from the electronic camera 1 in the past. That is, if the result of the calculation of error check by the picture bank server 34 and the result of calculation of error check by the electronic camera 1 are identical for some portions, it is judged that data with correct contents have been stored for those portions. On the other hand, if both the results of calculation are different from each other for some portions of the movie image file, it is judged that data with incorrect contents have been stored for those portions. After performing the error check in this manner to judge which portions of the movie image file are correct and which portions of the movie image file are incorrect, the procedure proceeds to next step S210.

In step S210, a retransmission start position for starting transmission of the movie image file again is set based on the result of the error check performed in step S209. On this occasion, the retransmission start position is set so that the retransmitted portion sets aside the portions judged to be correct but includes the portions judged to be incorrect. By setting the retransmission start position of the movie image file in this manner, the portions to be retransmitted can be designated based on the error check information transmitted in the past from the electronic camera 1 on the movie image of which transfer was interrupted. As a result, it is possible to instruct the electronic camera 1 to retransmit the movie image file except for the portions which have already been transmitted before the interruption.

In step S211, the image file selected in step S205 is set as a target of transfer. In next step S212, it is judged whether all of the non-transmitted image files represented by the file information received in step S204 has been selected in step S205 that has been thus far performed. If there are some non-transferred image files that have not been selected yet, the procedure returns to step S205. In step S205 any one image file is selected from such image files, and the above-mentioned processing is performed on the thus selected image file. As a result, the processing described in steps S206 to S211 is performed for all the non-transferred image files. On the other hand, if all the non-transferred image files have been selected in step S205, the procedure proceeds to step S213.

In step 213, transfer instruction information is transmitted to the electronic camera 1. On this occasion, transfer instruction information on the image file that has been set as a target of transfer in step S211 is transmitted to thereby instruct the electronic camera 1 to transfer the image file. The transmitted transfer instruction information is received by the electronic camera 1 in step S113 in FIG. 4, with the result that the image file corresponding to the instruction of the picture bank server 34 is transferred from the electronic camera 1.

In step S214, the image file transferred from the electronic camera 1 in step S117 is received. In next step S215, the user of the electronic camera 1 is specified based on the camera ID received in step S200 and it is judged whether the specified user has already been completed user registration in the picture bank server 34. If the user registration has been completed, the procedure proceeds to step S216 whereas if the user registration has not been completed yet, the procedure proceeds to step S217. A specific method for user registration will be explained later referring to the flowchart shown in FIG. 6.

If it has been judged that the user registration has been completed in step S215, the image file is stored in a user folder in step S216. The user folder is a recording area set in the recording device of the picture bank server 34 at the time of user registration in order to record the captured images transferred from the electronic camera 1. The picture bank server 34 assigns a predetermined quantity of memory in the recording device as a user folder for each user who has completed user registration. If a plurality of electronic cameras is registered for one and the same user, the picture bank server 34 assigns a quantity of memory corresponding to the number of electronic cameras to the user folder for such user. After the user registration is performed in this manner, the captured images are recorded in the user folder. When the processing in step S216 is performed, the picture bank server 34 ends the process of the flowchart shown in FIG. 5.

On the other hand, if it has been judged in step S215 that the user registration has not been completed yet, image files are stored in a temporary folder in step S217. The temporary folder is a recording area set in advance in the recording device of the picture bank server 34 in order to record the captured images transferred from the electronic camera 1. The picture bank server 34 assigns in advance a predetermined quantity of memory as a temporary folder in the recording device for each electronic camera 1. In this manner, before the user registration is performed, the captured images are recorded in the temporary folder. After the user registration is completed, the image files thus far recorded in the temporary folder are moved into the user folder.

In step S218, an e-mail is transmitted to the e-mail address of the user to invite user registration. The e-mail is called welcome mail, which contains URL (Uniform Resource Locator) information of registration page as information for connecting to the registration page at which user registration is performed. On this occasion, the welcome mail is transmitted after determining the e-mail address of the destination based on the information on e-mail address transmitted when the image file is transferred by the electronic camera 1. When the processing in step S218 is performed in this manner to record an image in the temporary file in step S217, a welcome e-mail is transmitted to the user accordingly. After the processing in step S218 is performed, the picture bank server 34 ends the process of the flowchart shown in FIG. 5.

If a welcome mail has already been transmitted to the user, the URL of the registration page is rewritten to another one when the welcome mail is transmitted in step S218. In this manner, each time when a welcome mail is transmitted, the URL, which is information for connection to the registration page, is changed. Further, the URL described in the welcome mail transmitted in the past is made invalid and only the URL described in the latest welcome mail that is transmitted this time is made valid. This can prevent a third party who has illegally obtained the past welcome mails from trying to perform user registration without permission of the user.

By performing the transfer image storage processing as explained above, the picture bank server 34 stores the images transferred from the electronic camera 1.

6. User Registration Processing

Figure 6:
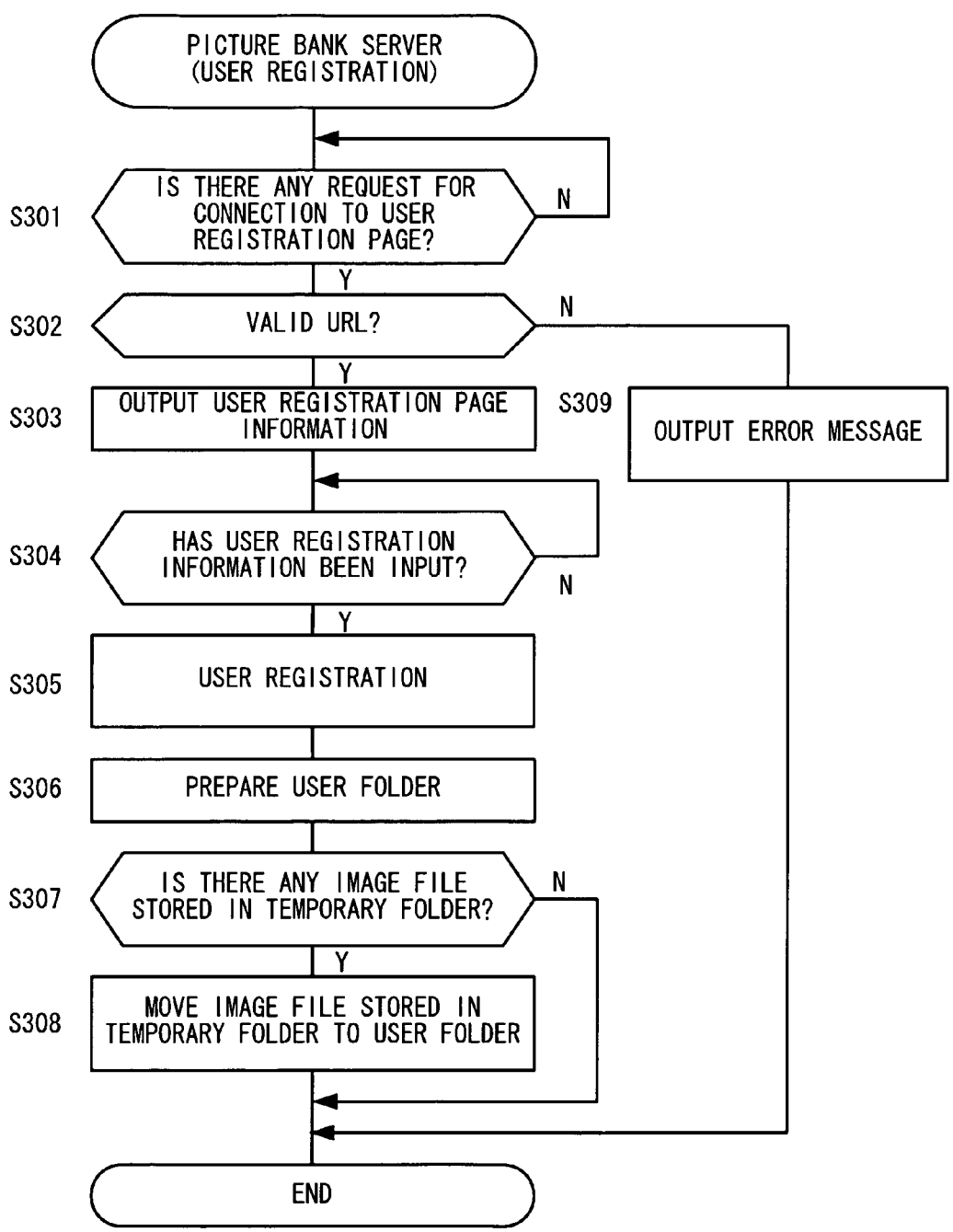
FIG. 6 is flowchart illustrating user registration processing performed in the picture bank server.

Next, the operation of the picture bank server 34 upon user registration is explained. FIG. 6 is a flowchart illustrating the user registration processing performed by the picture bank server 34 on this occasion. Hereafter, explanation is made referring to the flowchart shown in FIG. 6.

In step S301, it is judged whether there has been a request for connection to the user registration page. The request for connection to the user registration page is performed by the user by operating the PC 35 so that the welcome mail transmitted from the picture bank server 34 in step S218 shown in FIG. 5 is received by the PC 35 and URL of the registration page described in the welcome mail is selected by, for example, clicking. The request for connection is input to the picture bank server 34 through the home access point 32 and the Internet 33.

In step S302, it is judged whether the URL designated in the request for connection in step S301 is a valid URL. As mentioned above, the picture bank server 34 makes only the latest URL valid and the past URLs invalid when it transmits a welcome mail in step S218 in FIG. 5. Therefore, if the latest URL judged to be valid is designated in the request for connection, the procedure proceeds to step S303. On the other hand, if the invalidated URL is designated in the request for connection, the procedure proceeds to step S309.

In step S303, user registration page information for displaying a user registration page is output to the PC 35 connected through the Internet 33. When the user registration page information is received by the PC 35, the user registration page is displayed on the monitor of the PC 35. On the user registration page, the user can input a password, key information for specifying the electronic camera 1 in the picture bank server 34, and so on as user registration information by operating the PC 35. The key information is displayed on the monitor of the PC 35 by a predetermined operation of the PC 35 and the contents of the key information are specific to each electronic camera 1.

In step S304, it is judged whether user registration information has been input in the PC 35. The procedure remains in step S304 until user registration information is input and proceeds to step S305 when some user registration information is input.

In step S305, user registration is performed based on the user registration information input by the user in step S304. On this occasion, the electronic camera 1 owned by the user is specified based on the above-mentioned key information input as the user registration information and the electronic camera 1 and the user are registered in correlation. Then the contents of the user registration information input by the user are recorded in the picture bank server 34.

In step S306, a user folder is created in the recording device of the picture bank server 34 for the user who has made registration in step S305. The user folder is assigned a predetermined quantity of memory. As mentioned above, if a plurality of electronic camera is registered for one and the same user, a quantity of memory corresponding to the number of electronic camera is assigned to the user folder.

In step S307, it is judged whether there is any image file stored in a temporary folder set in advance in the recording device of the picture bank server 34 for the electronic camera 1 owned by the user who has made user registration in step S305. On this occasion, the electronic camera 1 owned by the user is specified based on the above-mentioned key information input as the user registration information. If the image file or files transmitted from the thus specified electronic camera 1 are stored in the temporary folder set for the electronic camera 1, the procedure proceeds to step S308.

In step S308, the image files stored in the temporary folder are moved into the user folder prepared in step S306. With this construction, the images that have been temporarily recorded in the temporary folder before the user registration are moved into the user folder prepared for each user. After the processing in step S308 is performed, the picture bank server 34 ends the process of the flowchart in FIG. 6.

On the other hand, if it has been judged that no image file is stored in the temporary folder in step S307, the picture bank server 34 does not perform the processing in step S307 and ends the process of the flowchart in FIG. 6. On this occasion, images are not moved from the temporary folder to the user folder.

If it has been judged in step S302 that the URL designated by the request for connection is an invalid URL, an error message is output to the PC 35 in step S309. When the PC 35 has received the error message, it notifies the user of this fact by displaying a message to the effect that the user registration cannot be made. After the processing in step S309 is performed, the picture bank server 34 ends the process of the flowchart in FIG. 6.

By performing the user registration process as explained above, the picture bank server 34 performs user registration of the electronic camera 1 in response to the instruction for registration from the PC 35 connected therewith through the Internet 33.

7. Reset Processing

Figure 7:
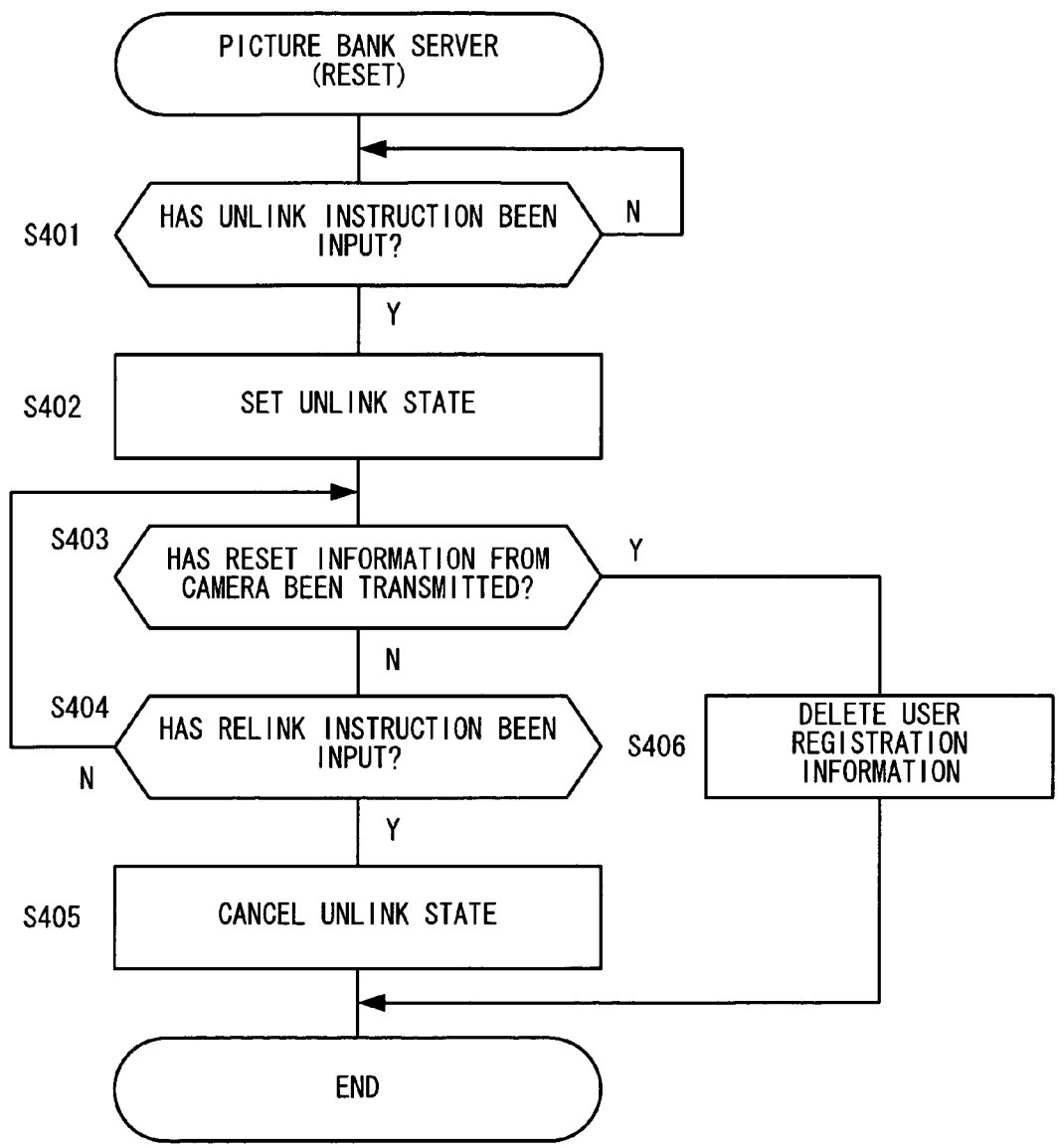
FIG. 7 is a flowchart illustrating reset processing performed by the picture bank server.

Next, explanation is made on the operation of the picture bank server 34 when the user registration is reset. FIG. 7 is a flowchart illustrating the reset processing performed by the picture bank server 34 on this occasion. Hereafter, explanation is made referring to the flowchart in FIG. 7.

In step S401, it is judged whether an unlink instruction has been input by the user. The unlink instruction is an instruction that is issued by the user in order to temporarily prohibit transfer of captured images from the electronic camera 1 to the picture bank server 34. Input of the unlink instruction is performed by the user by operating the PC 35 connected to the picture bank server 34 through the Internet 33. If there has been no input of the unlink instruction, the procedure remains at step S401 whereas if there has been input of the unlink instruction, the procedure proceeds to step S402.

In step S402, the electronic camera 1 is set in an unlink state. With this construction, the correlation of the electronic camera 1 with the user made upon the user registration is temporarily invalidated in response to the unlink instruction by the user. If it is tried to transfer captured images from the electronic camera 1 to the picture bank server 34 when the electronic camera 1 is thus set in an unlink state, the transfer of the images becomes impossible since the electronic camera 1 is judged to be an unusable camera in step S201 in FIG. 5.

In step S403, it is judged whether reset information has been transmitted from the electronic camera 1. The reset information is automatically transmitted from the electronic camera 1 to the picture bank server 34 when a predetermined reset operation is performed by the user in the electronic camera 1 and then the electronic camera 1 and the picture bank server 34 is connected to each other through wireless LAN. When a reset operation is performed in the electronic camera 1, the electronic camera 1 is initialized to a state of the original setting. On this occasion, the access point information, the nickname, the mail address, and so on registered in the electronic camera 1 are deleted.

If the reset information has been transmitted from the electronic camera 1 in step S403, the procedure proceeds to step S406. In step S406, the user registration information recorded in the picture bank server 34 is deleted. With this construction, the correlation of the electronic camera 1 with the user is canceled and the user registration is invalidated. If a captured image is transferred from the electronic camera 1 to the picture bank server 34 after the user registration was invalidated as mentioned above, the captured image is stored in the temporary folder in the picture bank server 34 in the same manner as before the user registration. After the processing in step S406 is performed, the picture bank server 34 ends the process of the flowchart in FIG. 7.

On the other hand, if no reset information has been transmitted from the electric camera 1 in step S403, the procedure proceeds to step S404. In step S404, it is judged whether a relink instruction is input by the user to the electric camera 1 that has been set in an unlink state in step S402. The relink instruction is an instruction that is issued by the user in order to bring the state of the electronic camera 1 from the unlink state to the original registered state. The user can return the state of the electronic camera 1 in the picture bank server 34 to the original registered state by performing the relink instruction, for example, when the user has set the electronic camera 1 to an unlink state by mistake or when the user has set the electronic camera 1 in an unlink state in order to prohibit the transfer of the captured images upon lending the electronic camera 1. Input of the relink instruction is performed by the user by operating the PC 35 connected to the picture bank server 34 through the Internet 33.

If there has been no input of the relink instruction in step S404, the procedure returns to step S403 and the judgment on the presence of transmission reset information is repeated. On the other hand, if there has been input of the relink instruction, the procedure proceeds to step S405.

In step S405, the unlink state set in step S402 is canceled. With this construction, the correlation of the electronic camera 1 with the user temporarily invalidated is returned to the original registered state. After the processing in step S405 is performed, the picture bank server 34 ends the process of the flowchart in FIG. 7.

By performing the reset processing as explained above, the picture bank server 34 temporarily invalidates the user registration of the electronic camera 1 in response to the unlink instruction from the PC 35 connected thereto through the Internet 33. Further, it recovers the temporarily invalidated user registration in response to the relink instruction from the PC 35.

8. Transfer Interrupted Image Storage Processing

Figure 8:
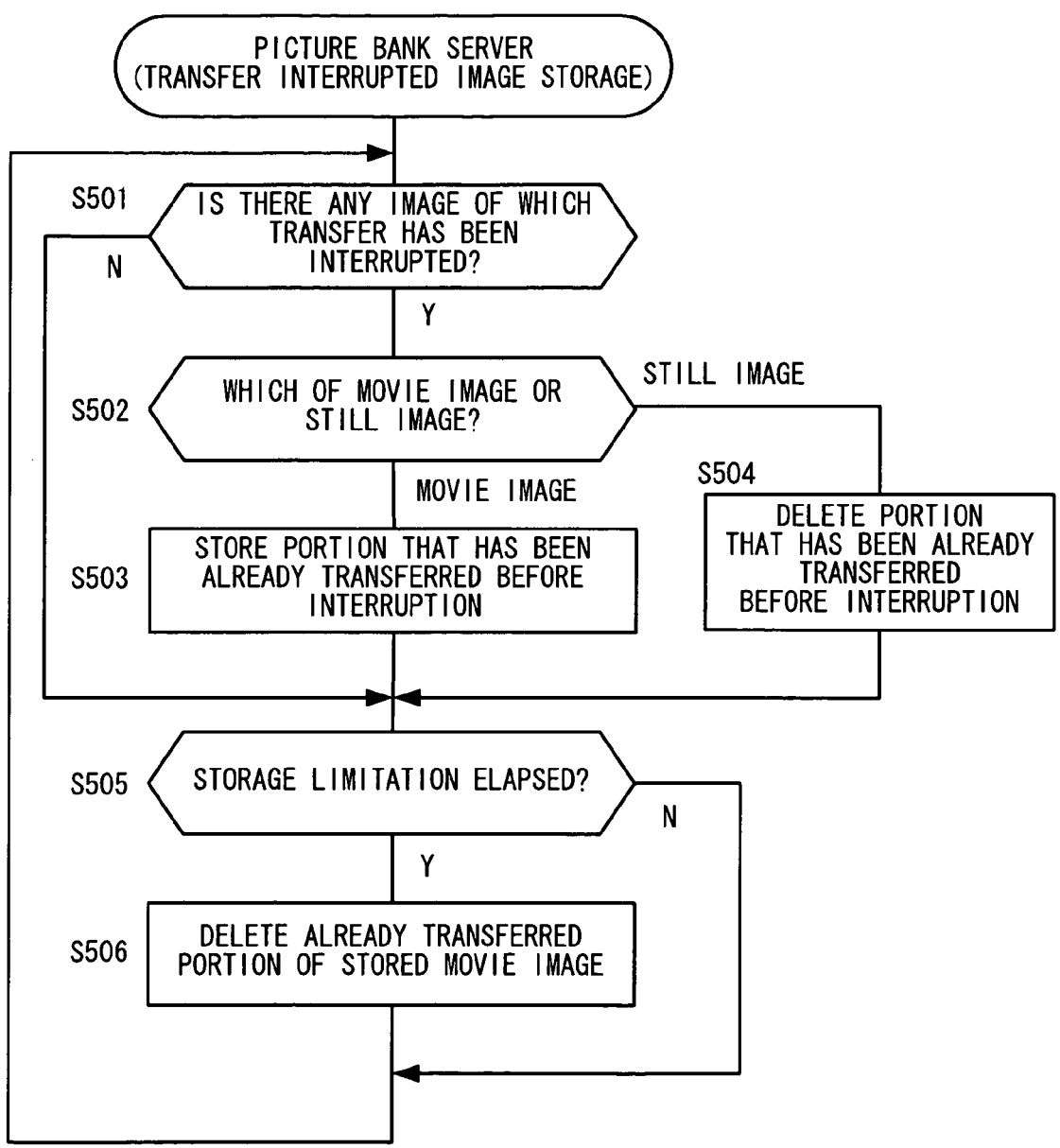
FIG. 8 is a flowchart illustrating transfer-interrupted image storage processing performed by the picture bank server.

Next, explanation is made on the operation of the picture bank server 34 when image transfer from the electronic camera 1 is interrupted. FIG. 8 is a flowchart illustrating the transfer interrupted image storage processing performed by the picture bank server 34 on this occasion. Explanation is made referring to the flowchart shown in FIG. 8.

In step S501, it is judged whether there is an image of which transfer from the electronic camera 1 has been interrupted. If there is an image of which transfer has been interrupted in the picture bank serer 34, the procedure proceeds to step S502 whereas if there is no such image in the picture bank server 34, the procedure proceeds to step S503. The interruption of image transfer from the electronic camera 1 occurs when the user voluntarily interrupts the transfer by operating the cancel button while the image is being transferred or when the connection through wireless LAN cannot be maintained, for example, due to worsening of radio wave environment.

In step S502, it is judged whether the image of which transfer has been interrupted is a movie image or a still image. If the image is judged to be a movie image, the procedure proceeds to step S503. In step S503, a portion of the movie image, which portion has already been transferred before the interruption, is stored. On this occasion, the movie image portion is recorded and stored in the temporary folder before the user registration or in the user folder after the user registration.

On the other hand, if the image is judged to be a still image, the procedure proceeds to step S504. In step S504, the portion that has already been transmitted before the interruption is deleted from the still image. That is, in the case of the still image, even if there is a portion that has already been transferred before the interruption, that portion is not stored but is deleted. After step S503 or step S504 is performed, the procedure proceeds to step S505.

In step S505, it is judged whether a storage limitation for the portion of the movie image stored in step S503, which portion has already been transferred, has passed a predetermined storage limitation. If it has passed the predetermined storage limitation, the procedure proceeds to step S506 and the portion of the stored movie image that has already been transmitted is deleted. With this construction, when the already transferred portion of the movie image is stored in the picture bank server 34, it is stored for a predetermined period of time and after lapse of the time, it is deleted. As a result, it is prevented that the already transferred portion of the movie image, which is no longer necessary, is stored for a long period of time. After the processing in step S506 is performed, the procedure returns to step S501 and the above-mentioned processing is repeated. On the other hand, if it is judged that the storage limitation has not passed yet in step S505, the processing in step S506 is not performed and the procedure returns to step S501.

When the already transferred portion of the movie image has been stored in the above-mentioned manner, the quantity of data for that portion is deduced from the remaining recording capacity of the temporary folder or the user folder. That is, a value is obtained by deducing the quantity of data of the already transferred portion of the movie image stored in the temporary folder or the user folder from the recording capacity of the temporary folder assigned in advance to each electronic camera 1 or from the recording capacity of the user folder assigned in advance to each user. An upper limit value of total data quantity upon recording a still image or a movie image in the temporary folder or the user folder is determined based on this value. By so doing, the picture bank server 34 can maintain its storage capability even when transfer interruption of movie images occurs frequently.

By performing the above-explained transfer interruption image storage processing, the picture bank server 34 can store the already transferred portion of a movie image for a predetermined period of time when the transfer of the movie image by the electronic camera 1 is interrupted. As a result, upon retransfer by the electronic camera 1 of the movie image, of which transfer has been interrupted, the movie image can be retransferred from the middle thereof after removing the already transferred portion thereof.

According to the embodiments explained above, the following advantageous effects can be obtained.
(1) The electronic camera 1 is constructed such that the controller 17 judges whether the power for charging the rechargeable battery 4 is supplied from outside (step S1). When it has been judged that the power is supplied from outside, the captured image is transferred to the picture bank server 34 via the wireless LAN connected by the wireless LAN module 24 (step S117). With this construction, the captured image can be transferred from the electronic camera 1 at appropriate timing without any instruction for transfer by the user.
(2) When the controller 17 selects non-transferred image files in step S111, it judges whether each image file has been transferred to the picture bank server 34 based on the archive bits set to respective image files of captured images. Then, the controller 17 transfers the image files except for those image files judged to have already been transferred to the picture bank server 34 (step S117). With this construction, non-transferred captured images can be easily selected and transferred.
(3) The electronic camera 1 switches power ON or OFF by the power switch in the operation portion 16. The controller 17 judges whether the power is OFF (step S2) and if the power has not been judged to be OFF, the procedure proceeds to step S12. With this construction, the transfer of captured images is prohibited in the case where it has been judged that when the power of the electronic camera 1 has been turned ON and the power is supplied from outside in step S1. With this construction, unnecessary transfer of captured images can be prohibited when the electronic camera 1 is switched to external power operation and operated by the user.

(4) The controller 17 turns the power of the electronic camera 1 OFF after the captured images have been transferred to the picture bank server 34 in step S117 (step S14). With this construction, the power is prevented from being consumed wastefully.

(5) The electronic camera 1 detects the input operation by the user through the operation portion 16 and sets access point information by the controller 17 based on the input operation. The electronic camera 1 causes the controller 17 to control the wireless LAN module 24 based on the access point information to connect to the public access point 31 or the home access point 32 and transfers captured images to the picture bank server 34 through the connected access point (step S117). With this construction, the captured images can be transferred from the electronic camera 1 without inputting setting information used for the connection to the destination of transfer in advance by the user.

(6) In the electronic camera 1, the access point information set in the PC 35 connected thereto through a cable is received by the external interface 23 from the PC 35. The controller 17 causes the wireless LAN module 24 to connect to the public access point 31 or the home access point 32 based on the access point information. With this construction, the access point information can be set from the PC 35, which is a terminal device.

(7) In the electronic camera 1, the free-plan access point information registered in advance is stored in the memory 18. The controller 17 causes the wireless LAN module 24 to connect to the public access point 31 based on the free-plan access point information. With this construction, the captured images can be transferred from the electronic camera 1 without setting any access point information.

(8) The memory 18 stores access point information for connecting free of charge to the public access point 31 as the free-plan access point information. With this construction, the captured imaged can be transferred by connecting free of charge the electronic camera 1 to the public access point 31.

(9) The temporary folder and user folder for storing the captured images transferred from the electronic camera 1 are set in the recording device in the picture bank server 34. The picture bank server 34 performs user registration of the electronic camera 1 corresponding to an instruction for registration by the user (step S305). Before the user registration is performed, the captured images are stored in the temporary folder (step S217). After the user registration is performed, the captured images that have been stored in the temporary folder are moved into the user folder (step S308), and the captured images are stored in the user folder (step S216). With this construction, the captured images transferred from the electronic camera 1 can be appropriately sorted user by user and stored in the picture bank server 34.

(10) The picture bank server 34 transmits a welcome mail, which is an e-mail that invites user registration once a captured image is stored in the temporary folder (step S218) With this construction, it is possible to invite user registration for users who have not made user registration yet.

(11) In step S218, the picture bank server 34 transmits a welcome mail based on the mail address information transmitted together with the captured image from the electronic camera 1. With this construction, the welcome mail can be transmitted to the mail address of the user without fail.

(12) The welcome mail transmitted by the picture bank server 34 in step S218 includes URL of registration page as connection information for connecting to the registration page for performing user registration. With this construction, the user who has received the welcome mail can perform user registration without difficulty.

(13) In step S218, the picture bank server 34 changes the URL of the registration page and invalidates the URLs that have been transmitted in the past each time when a welcome mail is transmitted. With this construction, even when a third party who has illegally obtained the welcome mail in the past attempts to perform user registration, such attempt can be prevented.

(14) The recording device of the picture bank server 34 assigns to the temporary folder a predetermined quantity of recording capacity for each individual electronic camera 1 and assigns to the user folder a predetermined quantity of recording capacity for each user who has performed user registration. With this construction, an appropriate quantity of recording capacity can be assigned to each of the temporary folder and the user folder.

(15) When a plurality of electronic camera 1 has been registered for a single user, the recording device of the picture bank server 34 assigns to the user folder a quantity of recording capacity depending on the number of registered electronic cameras. With this construction, the recording capacity of the user folder can be increased depending on the number of registered electronic cameras for the user who owns a plurality of electronic cameras.

(16) The picture bank server 34 registers the electronic camera 1 and the user in correlation based on the user registration information input by the user in step S304 (step S305). With this construction, the captured images transferred from the electronic camera 1 can be appropriately sorted user by user and stored.

(17) When an unlink instruction is input by the user (step S401), the picture bank server 34 performs setting to an unlink state for invalidating the correlation of the electronic camera 1 with the user in response to the unlink instruction (step S402). When the unlink state is set, the picture bank server 34 prohibits transfer of the captured images from the electronic camera 1. With this construction, the user can instruct the picture bank server 34 to prohibit the transfer of the captured images from the electronic camera 1 temporarily.

(18) If reset information is transmitted from the electronic camera 1 when the unlink state has been set in step S402 (step S403), the picture bank server 34 cancels the correlation of the electronic camera 1 with the user and cancels the user registration (step S406). With this construction, the state of the electronic camera 1 in the picture bank server 34 can be returned to the state similar to that before the user registration in response to transmission of the reset information from the electronic camera 1.

(19) When a relink instruction is input by the user (step S404), the picture bank server 34 cancels the setting of the unlink state in response to the relink instruction and returns the correlation of the electronic camera 1 with the user that has been invalidated (step S405). With this construction, the user can return the state of the electronic camera 1 in the picture bank server 34 to the original registered state, for example, in the case where the electronic camera 1 has been erroneously set into an unlink state or where the electronic camera 1 has been set into an unlink state in order to prohibit the transfer of the captured images upon lending the electronic camera 1 to others.

(20) The electronic camera 1 connects to the wireless LAN through the wireless LAN module 24 and transfers still images or movie images to the picture bank server 34 through the controller 17 (step S117). On this occasion, when retransferring a movie image, transfer of which has been interrupted, the electronic camera 1 retransfers the movie image except for the portion that has already transferred before the interruption. With this construction, when the transfer of the movie image has been interrupted, the occurrence of extra communication time and extra communication data quantity required for the retransfer can be minimized.

(21) The electronic camera 1 calculates error check information for each predetermined data quantity of the movie image through the controller 17 (step S116) and transmits the calculated error check information to the picture bank server 34 when the movie image is transferred in step S117. Thereafter, when the movie image, of which transfer has been interrupted, is retransferred in step S117, the controller 17 retransfers the portion designated by the picture bank server 34 based on the error check information transmitted in the past. With this construction, only the portion, of which transfer has been interrupted, except for the portion that has been normally transferred before the interruption can be retransferred without fail.

(22) When the transfer of a movie image by the controller 17 of the electronic camera 1 has been interrupted, the picture bank server 34 stores the already transferred portion of the movie image only for a predetermined period of time (step S503). Then, after lapse of the predetermined period of time, the already transferred portion of the stored movie image is deleted (step S506). With this construction, it can be prevented that the already transferred portion of a movie image, which is unnecessary, is stored for a long period of time in the picture bank server 34.

The recording device of the picture bank server 34 determines an upper limit value of total data quantity upon recording a still image or a movie image transferred from the electronic camera 1 based on a value that is obtained by deducing the quantity of data of the already transferred portion of the movie image stored in step S503 from the recording capacity for the temporary folder assigned to each electronic camera 1 or the recording capacity for the user folder assigned to each user of the electronic camera 1. With this construction, even when transfer interruption of movie images occurs frequently, the picture bank server 34 can maintain its storage capability.

(24) The picture bank server 34 transmits transfer instruction information to the electronic camera 1 for designating the image file to be transferred (step S213). In the transfer instruction information, the picture bank server 34 designates to the electronic camera 1 a portion to be retransferred on a movie image of which transfer has been interrupted based on the error check information transmitted from the electronic camera 1 in the past. With this construction, it is possible to designate only the interrupted portion in the movie image, of which transfer has been interrupted, and retransfer it without fail.

(25) The electronic camera 1 stores in the memory 18 a plurality of types of access point information registered in advance for connecting the wireless LAN module 24 to the public access point 31. Then, the controller 17 selects any one of the plurality of types of access point information stored in the memory 18 based on the shipment target area for the electronic camera 1 set in advance, causes the wireless LAN 24 to connect to the public access point 31 based on the selected access point information, and transfers the captured images to the picture bank server 34 through the connected public access point 31. With this construction, appropriate public access point can be selected corresponding to the shipment target area for the electronic camera.

(26) The memory 18 stores a plurality types of access point information for connecting free of charge to the public access point 31 as free-plan access point information. With this construction, the captured images can be transferred by connecting the electronic camera 1 with the public access point 31 free of charge.

The above-mentioned embodiments and various modifications are merely exemplary. Therefore, the present invention is not limited to the contents of these embodiments and modifications as far as the features of the present invention are not damaged.

The disclosure of the following priority application is herein incorporated by reference:

Japanese Patent Application No. 2007-38021 (filed Feb. 19, 2007).

The invention claimed is:

1. An electronic camera comprising:
   a transfer control unit that transfers a captured image to a server through a wireless network;
   a power supply judgment unit that judges whether or not power supply from outside has started;
   a power source switching unit that switches a power source of the electronic camera to ON or OFF; and
   a controller that controls a state of power supply;
   wherein:
   when the power source of the electronic camera has been switched to OFF by the power source switching unit and if it has been judged by the power supply judgment unit that supply of the power has started, the controller switches the power source of the electronic camera from OFF to ON, and the transfer control unit transfers the captured image to the server, and
   when the power source of the electronic camera has been switched to ON by the power source switching unit and if it has been judged by the power supply judgment unit that supply of the power has started, the transfer control unit prohibits transfer of the captured image to the server.

2. The electronic camera according to claim 1, further comprising:
   a transfer judgment unit that judges whether or not each image file of the captured image has already been transferred to the server based on an archive bit set for each image file, wherein
   the transfer control unit transfers to the server image files except for image files that are judged to have already been transferred to the server by the transfer judgment unit.

3. The electronic camera according to claim 1, wherein
   the controller switches the power source of the electronic camera from OFF to ON after the transfer control unit has transferred the captured image to the server.

4. The electronic camera according to claim 1, wherein
   when the power source of the electronic camera has been switched to ON by the power source switching unit and if it has been judged by the power supply judgment unit that supply of the power has started, the controller switches power for actuation being supplied to each component of the electronic camera from a rechargeable battery so that the power for actuation is supplied to each component of the electronic camera from an AC adapter, and the transfer control unit prohibits transfer of the captured image to the server.

* * * * *